Nov. 3, 1942.  J. H. SHERTS  2,300,528
GLASS FORMING ROLL
Filed Feb. 8, 1940

INVENTOR
JAMES H. SHERTS
BY Olew E. Bee
ATTORNEY.

Patented Nov. 3, 1942

2,300,528

UNITED STATES PATENT OFFICE 2,300,528

GLASS FORMING ROLL

James Hervey Sherts, Pittsburgh, Pa., assignor to Pittsburgh Plate Glass Company, Allegheny County, Pa., a corporation of Pennsylvania Application February 8, 1940, Serial No. 317,828

1 Claim. (Cl. 257—95)

The present invention relates to the production of plate glass and more particularly to the forming rolls which constitute a part of the apparatus used in such production.

A primary object of the invention is the provision of a forming roll capable of withstanding, without warping, the severe heat conditions to which it is exposed during the manufacturing operations.

Other objects and advantages of my invention will become more apparent from the following detailed description of a preferred embodiment thereof.

One form of plate glass is obtained by rolling a body of molten glass into a sheet which is subsequently ground and polished. Since the surfaces of the forming rolls are in progressive contact with the molten glass, they are unevenly heated and warp, thus creating irregularities in the rolled sheet. By allowing for displacement of the rolls, the sheet must be of greater thickness than would ordinarily be the case if the forming rolls could be maintained in true alignment. Consequently more grinding is required to bring the two faces of the glass sheet to uniform parallelism and the manufacturing costs as well as material losses are increased.

I am aware that numerous improvements have been made to the earliest type of forming rolls, including provisions for cooling them. These modifications in design of the roll structure have improved their performance, but there is still present a decided tendency for them to become distorted, which substantially negatives the other advantages gained through the newer developments.

Briefly stated, the present invention contemplates the use of a high silica content glass in the fabrication of forming rolls which are serviceable and almost entirely unaffected by the severe heat conditions incident to their use.

One embodiment of my invention is illustrated in the accompanying drawing, wherein.

Figure 3:
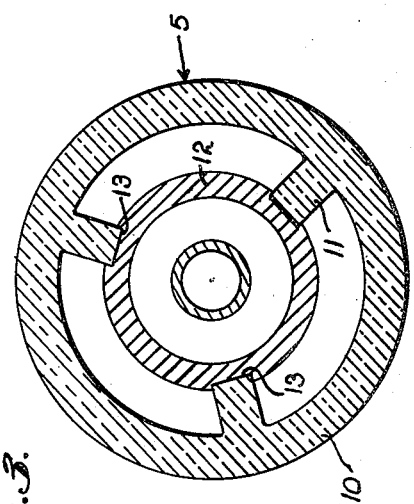
Figure 3 is a vertical sectional view, on a larger scale, through the roll taken at right angles to Figure 2.
Figure 1:
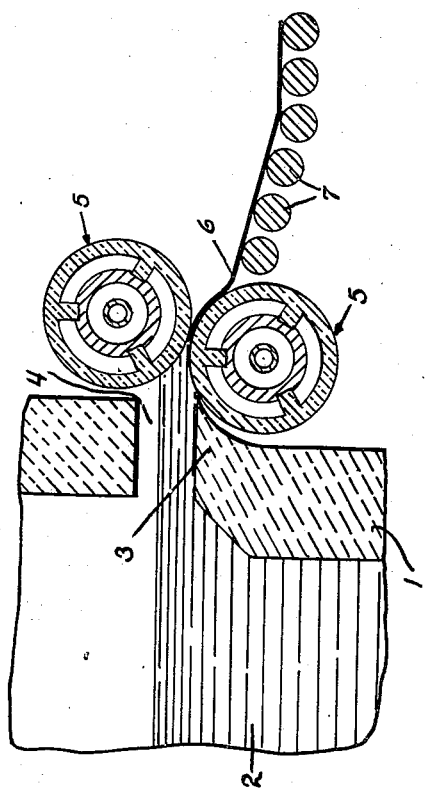
Figure 1 is a fragmentary vertical sectional view of a glass tank and rolling apparatus employing forming rolls constructed in accordance with the provisions of the invention.
Figure 2:
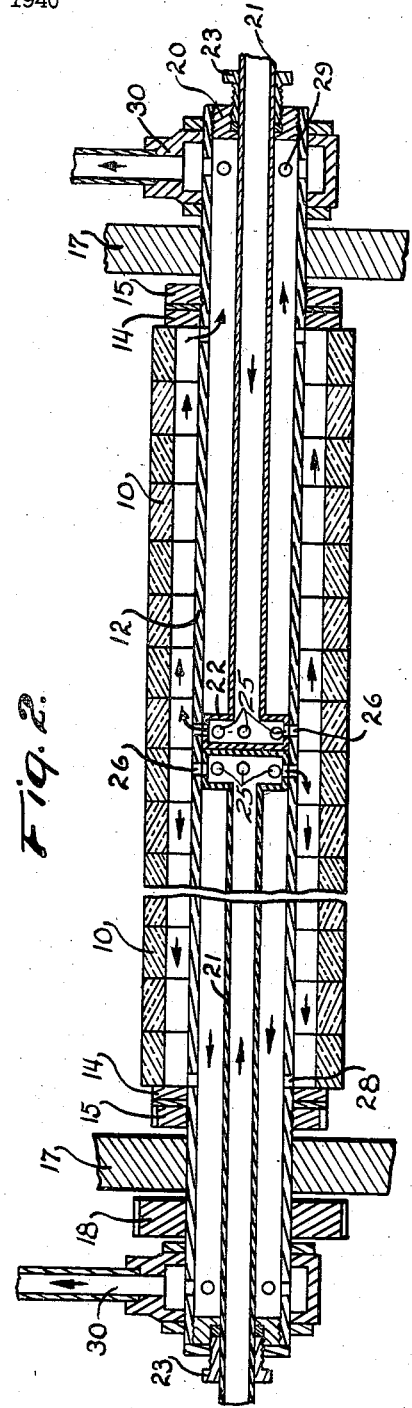
Figure 2 is a longitudinal section through one of the forming rolls.

Referring to the drawing, a glass tank 1 contains a body 2 of molten glass which passes over a lip 3 of an outlet slot 4 provided in one wall of the tank. The molten glass 2 flows between a pair of spaced forming or sizing rolls 5, with the production of a sheet 6 which is advanced over a plurality of rolls 7 and carried through a suitable annealing leer (not shown).

The structure of the rolls 5 constitutes the principal subject matter of this invention and it will be apparent that they could be substituted for the conventional forming rolls employed in other types of plate glass rolling apparatus.

The rolls 5 comprise a plurality of rings 10 of high silica content glass suitably assembled and locked together. A glass from which the rings 10 are formed is designed to contain approximately 96 per cent of silicon dioxide admixed with a small percentage of boric oxide. A glass of this composition has a melting or softening point above 2500° F. and is capable of withstanding temperatures in the range of from 1800° to 2000° F. which are generally encountered in the production of plate glass. A more important characteristic of this glass is its coefficient of thermal linear expansion of about $8 \times 10^{-7}$ per centigrade degree, a factor which precludes distortion of the glass upon heating.

The rings 10 are cast or molded with centrally projecting lugs 11 (Fig. 3) which space the rings from an inner supporting cylinder 12 constituting the core of the forming roll. The cylinder 12 has formed in its outer surface suitable splines or channels 13 into which the lugs 11 fit, thus securing the rings 10 to, and permitting their rotation with, the cylinder. Lateral displacement of the rings upon the cylinder is prevented by collars 14, locked in position by nuts 15 threaded onto the cylinder. The cylinder 12 is journalled in bearings 17 positioned at each end thereof and driven by any suitable means (not shown) engaging a gear 18 secured to the cylinder. Before assembling the faces of the rings 10 are ground to insure a close fit thereof and the assembled roll is machined or ground to a true cylindrical surface.

The ends of the cylinder 12 are closed by dams or plugs 20 through which extend conduits 21 terminating centrally in distributing heads 22. Packing glands 23 secure the conduits 21 in the plugs 20. A cooling fluid, such as air or water is passed through the conduits 21 into the distributing heads 22 and is forced through openings 25 provided therein and aligned with openings 26 in the cylinder 12 into the space between the cylinder and the rings 10. The cooling fluid circulates toward the ends of the roll, as indicated by the arrows, flows into the cylinder 12 again through openings 28 and is discharged through openings 29 leading to a conduit 30 swivelly connected to the cylinder. The forced cooling of the rolls as described will maintain the temperature of the supporting cylinder sufficiently low to prevent distortion thereof.

A fused silica, such as is employed in the rings 10, has exhibited its ability to stand wide variations in temperatures without fracturing and accordingly the rolls 5 are insured of a relative permanence.

Since the forming rolls are cooled, the molten glass being rolled will not adhere thereto and the sheet production may be continued for long runs without interruption for repairs or cleaning. Again the low temperature of the rolls precludes surface erosion of the discs by the fluxes of the molten glass and the original machined surfaces will not require intermittent refinishing.

Various other methods of supporting the glass rings 10 upon the inner cylinder 12 are possible. It should be pointed out, however, that the metal cylinder 12 will have a greater coefficient of linear expansion than the glass rings and proper allowance must be made therefor.

Accordingly it is desirable to retain forced cooling of the roll to prevent distortion of the metal cylinder.

What I claim is:

A glass forming roll comprising a plurality of rings of high silica content glass having centrally projecting lugs positioned upon and spaced from an inner supporting cylinder, the ring lugs engaging suitable channels in the surface of the cylinder, and means for circulating a cooling fluid through the cylinder and the glass rings.

JAMES HERVEY SHERTS.